Patented Apr. 14, 1936

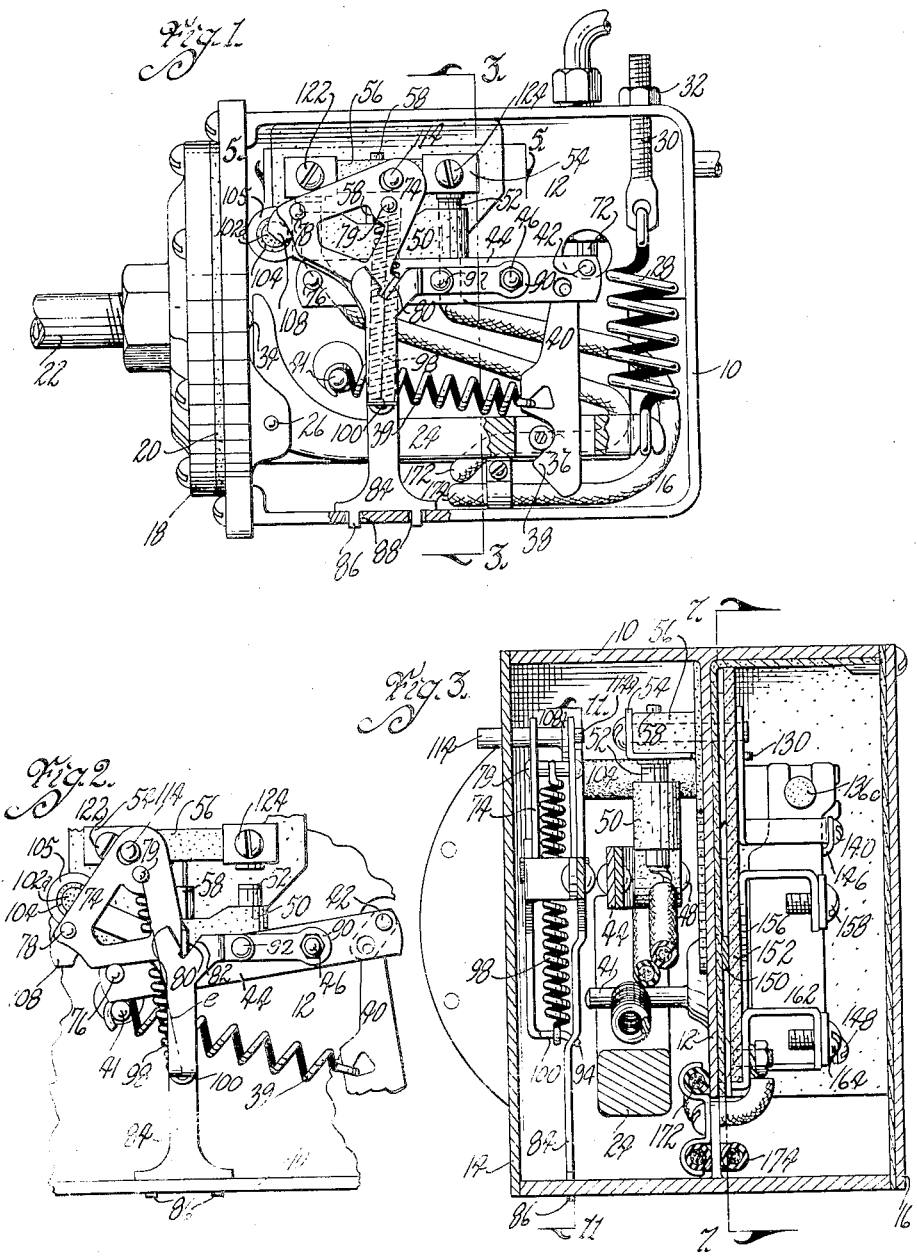

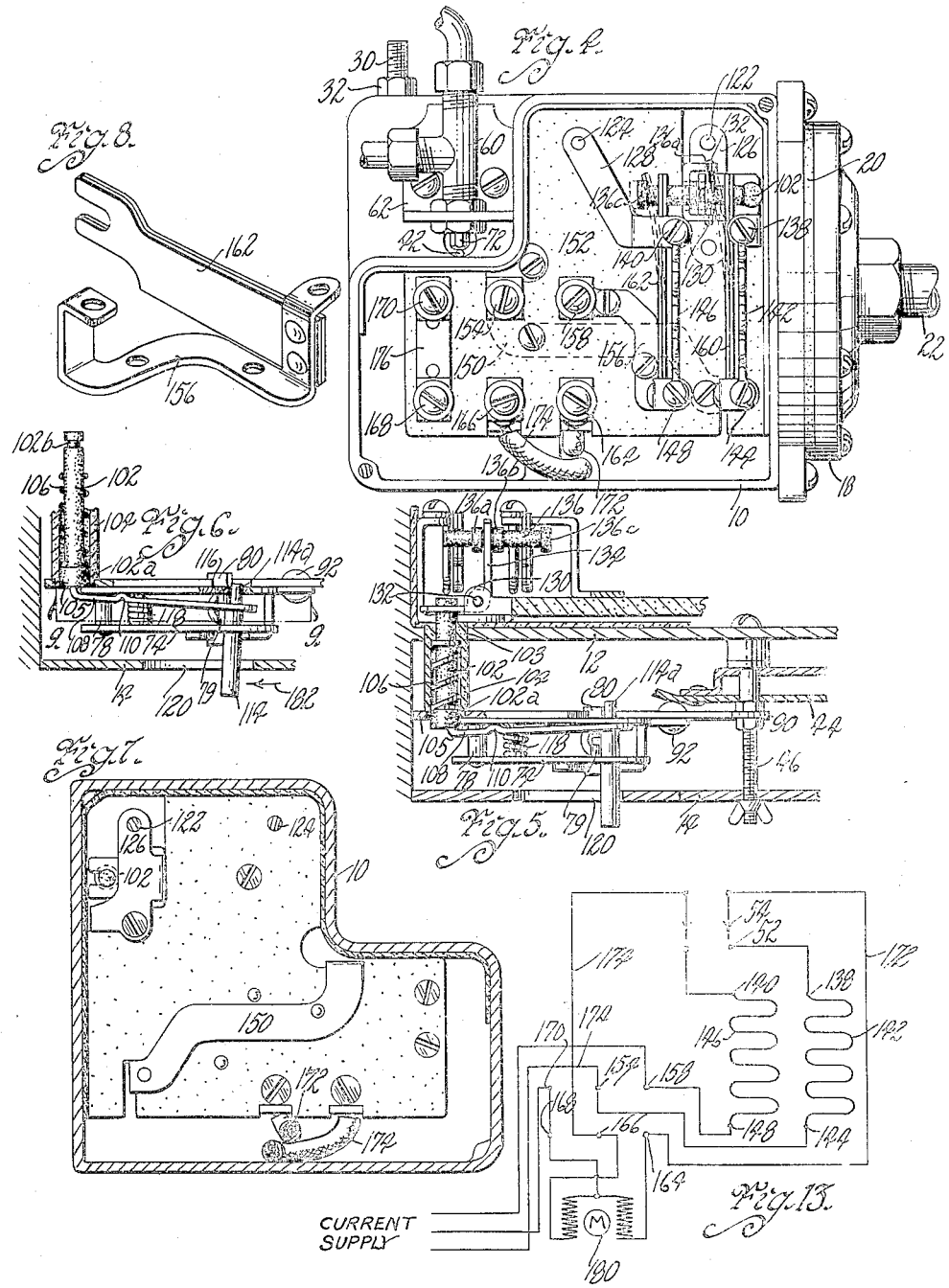

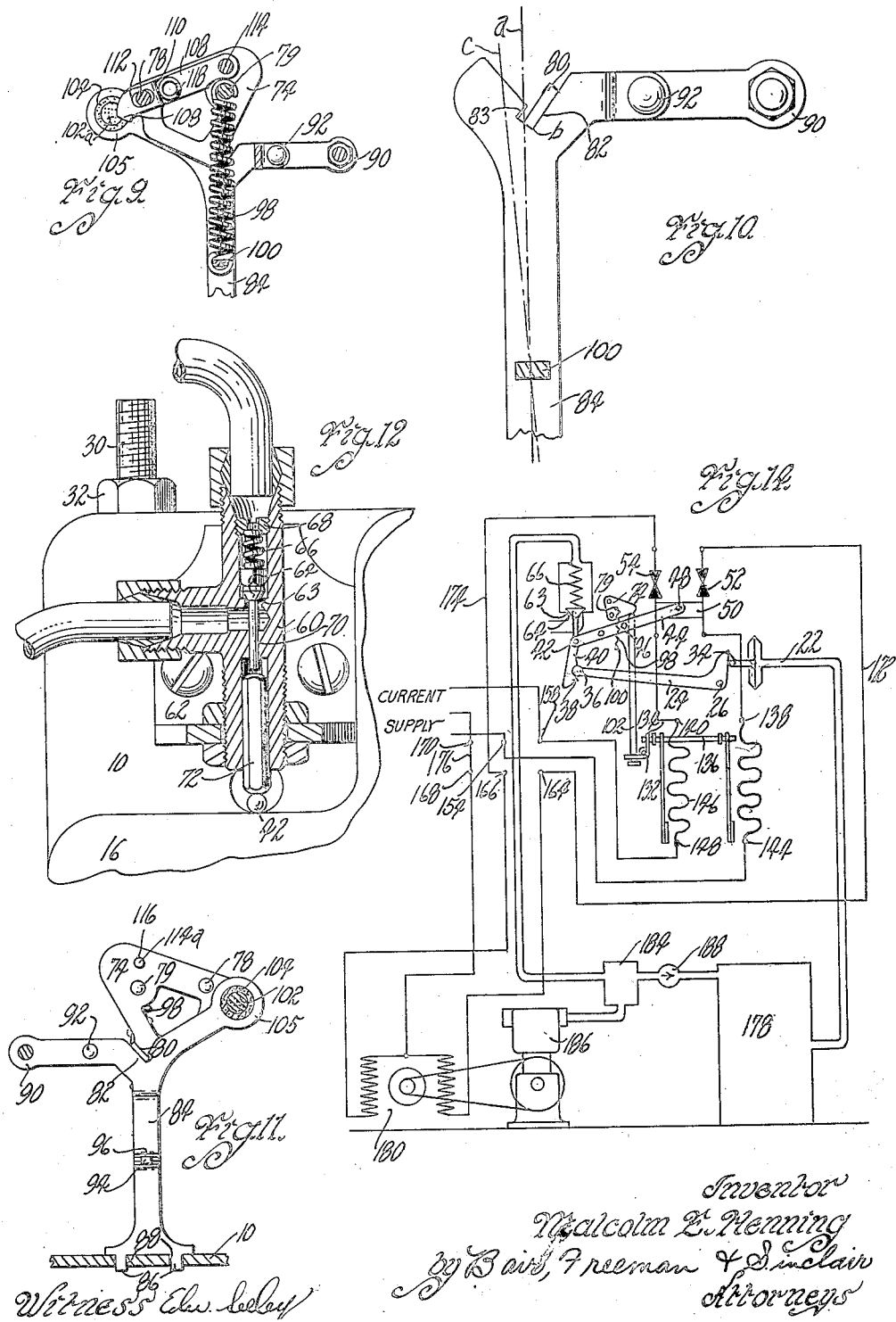

2,037,128

UNITED STATES PATENT OFFICE 2,037,128

COMPRESSOR CONTROL STRUCTURE

Malcolm E. Henning, Des Moines, Iowa, assignor to Penn Electric Switch Co., Des Moines, Iowa, a corporation of Iowa Application November 3, 1930, Serial No. 493,011

4 Claims. (Cl. 200—81)

An object of my present invention is to provide a compressor control structure for controlling both the motor circuit of the compressor motor and the unloader mechanism of the compressor, the structure being of simple and durable construction.

A further object is to provide a control structure in which a control switch is automatically operable depending on pressure produced by a compressor for thereby controlling the circuit of the compressor motor.

A further object is to provide such a control structure with a means for manually controlling the same independent of the automatic operation thereof.

A further object is to provide a unitary structure wherein a switch is responsive to pressure for its automatic operation and likewise operates automatically for operating an unloader valve used in connection with a compressor structure and means for controlling the opening of the switch and simultaneously therewith opening or operating the valve.

It may be here mentioned that by providing a manual control upon the switch itself, I am able to empty the unloader chamber of a compressor structure irrespective of whether or not the switch circuit is open or closed. In some instances, the compressor switch may be in closed position and the compressor in operation when the complete electric circuit is cut off by the operation of a master control for the entire power supply line. When the master control cuts off the supply of current it in no way affects the automatic switch which controls the compressor, although no current reaches the switch and therefore the compressor stops. The switch remains in closed position and the unloader chamber of the compressor remains filled with air.

It is desirable, before the master switch is again closed to bleed the air from the unloader chamber and I have provided a single manual control upon the automatic switch for the compressor which may be operated and will open the unloader valve permitting air from within the unloader chamber to bleed to atmosphere. The manual control which forms part of a unitary structure, that is a part of the switch mechanism and the unloader valve associated therewith, is of vital importance in devices that automatically control compressor structures. Bleeding air to atmosphere is the common way of unloading a compressor.

The manual control changes the position of the switch of which it forms a part, while cutting off the electric circuit by a master control does not, in itself, change the position of the switch.

In some instances, the unloading is accomplished by charging a valve chamber of the compressor with tank pressure by means of a valve structure operated simultaneously with the switch mechanism.

Another object is to provide a thermal overload control whereby to open the motor circuit upon an abnormal overload of the motor.

Still a further object is to provide the manual and thermal controls also operable to actuate an unloader valve.

Another object is to provide a thermally released control for a control switch which has an over-center spring mechanism and design the parts so that a comparatively weak thermal element may operate to control the switch arm even though the over-center spring mechanism is comparatively stronger.

A further object is to provide a switch lever for actuating a switch arm which is controlled by an over-center spring mechanism, the switch lever being provided with a latch which is both manually and thermally releasable, a spring being provided in connection with the switch lever and arranged for variable leverage exertion on the switch lever for actuating the same when the latch is released.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of a control structure embodying my present invention.

Figure 2 is a side elevation showing only part of Figure 1 with the parts in a different position.

Figure 3 is an enlarged sectional view on the line 3—3 of Figure 1.

Figure 4 is a side elevation of the switch structure viewed from the side opposite Figure 1.

Figure 5 is a sectional view on the line 5—5 of Figure 1 showing the device in a normal position.

Figure 6 is a similar view showing the device being manually released.

Figure 7 is a sectional view on the line 7—7 of Figure 3.

Figure 8 is a perspective view of one of the thermal elements.

Figure 9 is a sectional view on the line 9—9 of Figure 6.

Figure 10 is an enlarged view of a portion of

Figure 1 showing relative positions of parts of the control structure.

Figure 11 is a sectional view on the line 11—11 of Figure 3.

Figure 12 is an enlarged view of a portion of Figure 4 showing the unloader valve in section.

Figure 13 is an electrical diagrammatic view showing the thermal unloader control of the switch structure; and Figure 14 is a mechanical and electrical diagrammatic view showing the entire control structure, a compressor, a compressor motor and a compressed air storage tank.

On the accompanying drawings I have used the reference numeral 10 to indicate a casing. The casing 10 is provided with a vertical partition 12 and suitable cover members 14 and 16. A diaphragm casing 18 is secured to one end of the casing 10 and has mounted therein a diaphragm 20. A compressed air pipe 22 is in communication with one side of the diaphragm 20.

A diaphragm arm 24 is pivoted at 26 and is constrained to move in one direction by means of a main spring 28. By means of a bolt 30 and a nut 32, the tension of the spring 28 may be adjusted. A thrust pin 34 extends from the diaphragm 20 and coacts with the diaphragm arm 24.

A roller 36 is carried by the diaphragm arm 24 and coacts with a V-cam 38 formed on a link 40. A spring 39 has one end connected with a stationary pin 41 and its other end connected with the link 40 for maintaining engagement between the link and the roller 36. The link 40 is operatively connected with a pin 42 of a switch arm 44. The switch arm 44 is pivoted on a bolt 46.

A pivot pin 48 is carried by the switch arm 44 and extends through a movable switch block 50. The movable switch block 50 carries contacts 52 which are coactable with stationary contacts 54 mounted on a stationary switch block 56. A guide pin 58 is secured to the movable switch block 50 and is slidable through the stationary switch block 56.

An unloader valve 60 is supported by means of a bracket 62 on a portion of the partition wall 12 of the casing 10. The internal construction of the valve 60 is best shown in Figure 12. A valve seat 63 is formed in the valve body 60. A valve plug 64 coacts with the seat 63. A spring 66 serves to maintain the plug 64 against the seat 63 and has one end in contact with the plug and its other end in contact with a hollow set screw 68.

A valve stem 70 extends downwardly from the block 64. An actuating pin 72 is slidably mounted in the body of the valve 60 and its upper end is engageable with the stem 70. The lower end of the actuating pin is engageable with the pin 42 of the switch arm 44.

In connection with the switch arm 44 I provide a triangular shaped lever 74 coactable with a pin 76 on the switch arm and which I shall term as a "switch lever." The lever 74 has two similar sides connected together by shouldered pins 78 and 79 riveted in position. Each side of the switch lever 74 is provided with a pivot lug 80. The pivot lugs 80 rest in notches 82 formed in a supporting bracket 84. The supporting bracket 84 is formed of two side members, one of which has prongs 86 inserted in openings 88 in the bottom wall of the casing 10 and an eye 90 secured to the bolt 46 by means of nuts. The other side of the bracket has one end riveted to the first mentioned side at 92 and a lug 94 formed on its other end to extend through an opening 96 in the first mentioned side. A spring 98 has one end connected with the pin 79 and its other end connected with a cross bar 100 of the bracket 84 as best shown in Figure 3 of the drawings.

I provide a latch means for the switch lever 74 consisting of a latch pin 102 slidably mounted in a sleeve 104. The sleeve 104 is supported in an opening 103 in the partition wall 12, and an eye 105 formed on the bracket 84. A spring 106 is provided within the sleeve 104 and has one end coacting with a shoulder therein and its other end coacting with a head 102a of the pin 102. The head 102a is adapted to normally extend to a position obstructing the movement of the triangular shaped switch lever 74, as best shown in Figure 5 of the drawings.

In order to release the latch pin 102 manually, I provide a latch release lever 108 having a depressed portion 110 acting as a pivot for the latch release lever. The latch release lever 108 is carried by the triangular shaped switch lever 74 and is held in the desired position with respect thereto by means of a slot 112 formed therein through which the pin 78 extends and a manually engageable pin 114 connected with the lever 108 and having a reduced extension 114a extending through an opening 116 formed in one side of the triangular shaped switch lever 74. A spring 118 serves to normally maintain the latch release lever 108 in the position shown in Figure 5. A curved slot 120 is provided in the cover member 14 for movement of the manually engageable pin 114.

Screws 122 and 124 extend from the contacts 54 through the stationary switch block 56, the partition wall 12 and into brackets 126 and 128 respectively.

The bracket 126 is provided with ears 130, as best shown in Figures 4 and 5 of the drawings, which support a pivot pin 132. A bell crank lever 134 with forked arms is pivotally mounted on the pin 132. One of the forked arms of the lever 134 coacts with a groove 102b formed in the latch pin 102 and the other one is located between enlargements 136a and 136b of a thrust pin 136.

From the screws 122 the bracket 126 terminates in an end provided with a screw 138. From the screw 124 the bracket 128 terminates in an end provided with a screw 140. A resistance element 142 has one end connected with the screw 138 and its other end connected with a screw 144. A resistance element 146 has one end connected with the screw 140 and its other end connected with a screw 148. The screw 144 is located in one end of a bracket 150 which extends under an insulating plate 152, on which the parts 126 to 150 and others are located, and terminates in a terminal end provided with a screw 154. The screw 148 is located in one end of a bracket 156 which terminates in a terminal end provided with a screw 158.

Bimetallic strips 160 and 162 are riveted to the brackets 150 and 156 respectively. The elements 160 and 162 have their free ends slotted as best shown in Figure 8, the thrust pin 136 extending through the slotted ends thereof. The bimetallic element 160 is adapted to coact with the enlargement 136a of the thrust pin 136 and the element 162 is adapted to coact with a head 136c of the thrust pin.

Terminal screws 164, 166, 168, and 170 are provided on the insulating plate 152. The terminal screw 164 is connected by a flexible lead 172 with the contact 54 which is connected with the screw 122. The terminal screw 166 is connected by a flexible lead 174 with the contact 54 which is connected with the screw 124. A connecting bar 176 extends from the screw 168 to the screw 170.

PRACTICAL OPERATION

First.—Automatic control

Referring to Figure 14, the pipe 22 communicating with the diaphragm 20 is connected with a compressed air storage tank 178. The switch contacts 52 and 54 are included in the circuit of a compressor motor 180. When the motor 180 is of the three phase type, any two wires are connected with the terminal screws 164 and 166 whereby the circuit is opened and closed by the contacts 52 and 54. The third wire merely leads through the connector 176 by connection with the terminal screws 168 and 170. The three motor leads are connected to the terminal posts 164, 166 and 168. When a two wire motor is used, the connector 176 is, of course, not used.

Since the diaphragm 20 is controlled by the pressure in the storage tank 178, it will be obvious that increase of the pressure to a predetermined point will lower the roller 36 causing it to pass over the point of the V-cam 38, whereupon the switch block 50 will be moved downwardly for separating the contacts 52 from the contacts 54. When the pressure in the storage tank 178 is lowered to a predetermined point, the roller 36 will move upwardly and cause re-engagement of the switch contacts.

Second.—Thermal overload release of the control switch

Referring to Figure 13 it will be noted that the heating elements 142 and 146 are included in two wires of the motor circuit so that in the event one of the supply lines or wires burns out or a single phase condition exists, the remaining phase will be overloaded and will consequently heat one or both of the heating elements.

Referring to Figure 14 it will be evident that heating of either element 142 or 146 will warp the adjacent bimetallic element causing it to move the thrust pin 136 and the latch pin 102 against the action of the spring 106, whereupon the pin 76 on the switch arm 44 will be engaged by the triangular shaped switch lever 74 and thereby moved to open the switch contacts 52 and 54 by the action of the spring 98.

Very little power is developed by the bimetallic element as it is moved by the heater element and accordingly it is desirable to not impose much tension on the triangular shaped switch lever 74 as it engages the edge of the latch pin 102. It will therefore be noted that the pin 79 and cross bar 100 to which the spring 98 is secured, are in a center line —a— (see Figure 10) which is relatively close to the pivot point —b— of the pivot lug 80 of the switch lever 74. After the switch lever 74 starts to move, however, the center line will be shifted to the position —c—, where the pull of the spring 98 is relatively greater, whereupon the lever 74 will engage the pin 76 for thereby moving the switch arm 44 to open circuit position.

Referring to Figure 2, it will be noted that the center line —e— is considerably farther away from the pivot lug 80, whereby the leverage exerted by the spring 98 is greatly increased so that it can overcome the force of the spring 39 which is exerted to maintain the link 40 against the roller 36.

Thus a thermally operated latch pin may release the spring 98 when its leverage exertion is small, whereafter the leverage exertion increases, and due also somewhat to the help of momentum in moving the triangular shaped switch lever 74 from the position shown in Figure 1 to the position shown in Figure 2, the spring 98 overcomes the tension of the over-center spring 39 to thereby open the circuit.

Third.—Manually operated control for the switch

In order to manually operate the switch to open circuit position, the pin 114 may be engaged and moved in the direction of the arrow 182 (see Figure 6). The first thing this does is to swing the latch release 108 on its pivot 110 against the action of the spring 118 so that the latch pin 102 is pushed in against the action of the spring 106. This removes the latch pin from the path of movement of the triangular shaped switch lever 74, whereupon the lever will continue to move due to the action of the spring 98 and in so doing operate the switch to open circuit position.

The manually operable means is also utilized for re-setting the control structure by swinging the pin 114 in a clockwise direction, which moves the triangular shaped switch lever 74 to the position shown in Figure 1 where it does not coact with the pin 76 of the switch arm 44. The lever 74 is latched in this position by the pin 102 and allows the switch structure to re-assume automatic operation as caused by pressure changes on the diaphragm 20.

Shoulders 83, adjacent the pivot lugs 80 of the triangular shaped lever 74, serve as a stop means to limit the clockwise movement of the lever 74, as imparted thereto manually when re-setting the device.

Fourth.—Control of the unloader valve

The unloader valve 60 is connected with an unloader tank 184 located between the air compressor 186 and the storage tank 178. A check valve 188 is located between the unloader tank 184 and the storage tank 178. When the switch is in closed position as shown in Figure 14, the valve plug 64 is against the valve seat 63, thus closing the unloader tank 184 from communication with the atmosphere. When the switch is moved to open circuit position, however, the valve plug 64 is raised from the valve seat 63 thus providing communication between the unloader tank 184 and atmosphere, so as to bleed the air from the unloader tank. The check valve 188 prevents the return of air from the storage tank 178 into the unloader tank 184 and then through the valve 60 to the atmosphere.

It will thus be seen that whether the switch is automatically, thermally or manually controlled, the unloader valve is similarly controlled for thus placing it in the proper operative position when either of the three controls are actuated.

Aside from the particular type of unloader valve illustrated, the invention can be used with other types, and control devices other than switches can be provided for operation of the automatic, manual or thermal control mechanism. Also the unloader valve can be controlled alone.

Various other changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a control structure of the character disclosed, the combination of an automatic control switch including snap acting mechanism with a manual control for said control switch comprising a switch lever, a spring connected therewith and arranged for variable leverage exertion on said switch lever, a latch to maintain said switch lever in inoperative position when the leverage exertion is adjacent zero thereon and a latch release for releasing the latch thereby to allow said spring to first move said switch lever and then actuate said control switch to open circuit position when the leverage exertion is substantially above zero on said switch lever.

2. In a control structure of the character disclosed, the combination of a normally automatically controlled switch including snap acting mechanism with another control for said switch comprising a switch lever, a spring connected therewith and arranged for variable leverage exertion on said switch lever, a latch to maintain said switch lever in inoperative position when the leverage exertion is adjacent zero thereon and a manually operable latch release for releasing the latch thereby to allow said spring to first move said switch lever and then actuate said switch to open circuit position when the leverage exertion is substantially above zero on said switch lever.

3. In a control structure of the character disclosed, the combination of a normally automatically controlled switch including snap acting mechanism with another control for said switch comprising a switch lever, a spring connected therewith and arranged for variable leverage exertion on said switch lever, a latch to maintain said switch lever in inoperative position when the leverage exertion is adjacent zero thereon and a thermally operable latch release for releasing the latch thereby to allow said spring to first move said switch lever and then actuate said switch to open circuit position when the leverage exertion is substantially above zero on said switch lever.

4. In a control structure of the character disclosed, the combination of a normally automatically controlled switch including snap acting mechanism with another control for said switch comprising a switch lever, a spring connected therewith and arranged for variable leverage exertion on said switch lever, a latch to maintain said switch lever in inoperative position when the leverage exertion is adjacent zero thereon, a latch release for releasing the latch thereby to allow said spring to first move said switch lever and then actuate said switch to open circuit position when the leverage exertion is substantially above zero on said switch lever, manually operable means and thermally operable means associated with said latch release either one of which moves it to released position, said manually operable means being also associated with said latch release to re-latch it subsequent to its release.

MALCOLM E. HENNING.